US012782385B2

(12) United States Patent
Arai et al.

(10) Patent No.: US 12,782,385 B2
(45) Date of Patent: Nov. 3, 2026

(54) SCANNING PROBE MICROSCOPE, INFORMATION PROCESSING METHOD, AND PROGRAM

(71) Applicant: SHIMADZU CORPORATION, Kyoto (JP)

(72) Inventors: Hiroshi Arai, Kyoto (JP); Hideo Nakajima, Kyoto (JP); Shiho Moriguchi, Kyoto (JP); Chiharu Nakano, Fukuchiyama (JP)

(73) Assignee: SHIMADZU CORPORATION, Kyoto (JP)

( * ) Notice: Subject to any disclaimer, the term of this patent is extended or adjusted under 35 U.S.C. 154(b) by 296 days.

(21) Appl. No.: 18/696,244

(22) PCT Filed: Mar. 24, 2022

(86) PCT No.: PCT/JP2022/013775
§ 371 (c)(1),
(2) Date: Mar. 27, 2024

(87) PCT Pub. No.: WO2023/053528
PCT Pub. Date: Apr. 6, 2023

(65) Prior Publication Data

US 2024/0418746 A1 Dec. 19, 2024

(30) Foreign Application Priority Data

Sep. 28, 2021 (JP) ................................ 2021-158203

(51) Int. Cl.
*G01Q 30/04* (2010.01)
*G01N 15/02* (2024.01)

(52) U.S. Cl.
CPC ............ *G01Q 30/04* (2013.01); *G01N 15/02* (2013.01)

(58) Field of Classification Search
CPC ......... G01Q 30/00; G01Q 30/04; G01N 15/02
See application file for complete search history.

(56) References Cited

FOREIGN PATENT DOCUMENTS

| | | | |
|---|---|---|---|
| JP | 2000-275159 A | | 10/2000 |
| JP | 2014-504731 A | | 2/2014 |
| JP | 2020052043 A | * | 4/2020 |
| WO | 2012/100235 A2 | | 7/2012 |

(Continued)

OTHER PUBLICATIONS

Notice of Reasons for Refusal for corresponding Japanese Patent Application No. 2023-551046, dated Jan. 7, 2025.

(Continued)

*Primary Examiner* — David E Smith
(74) *Attorney, Agent, or Firm* — Muir Patent Law, PLLC

(57) ABSTRACT

A scanning probe microscope is equipped with an observation device for observing a sample containing particles and an information processing device. The information processing device generates one or more observation images based on observation data acquired by observing a sample with the observation device, calculates a particle parameter indicating a diameter of a particle image or the number of the particle images, the particle image being included in the observation image, and executes predetermined processing when an observation image including an image in which the particle parameter is outside a predefined observation range is included in one or more observation images.

11 Claims, 8 Drawing Sheets

(56) References Cited

FOREIGN PATENT DOCUMENTS

| | | | | | |
|---|---|---|---|---|---|
| WO | WO-2014054741 | A1 * | 4/2014 | ............. | G01Q 60/12 |
| WO | WO-2019130856 | A1 * | 7/2019 | ............. | G01N 15/02 |

OTHER PUBLICATIONS

Notice of Reasons for Refusal dated Oct. 15, 2024, for corresponding Japanese Patent Application No. 2023-551046.

PCT Written Opinion of the International Searching Authority dated Jun. 7, 2022, for PCT application No. PCT/JP2022/013775.

* cited by examiner

SCANNING PROBE MICROSCOPE, INFORMATION PROCESSING METHOD, AND PROGRAM

TECHNICAL FIELD

The present invention relates to a scanning probe microscope, an information processing method, and a program.

BACKGROUND ART

Japanese Unexamined Patent Application Publication No. 2000-275159 (Patent Document 1) discloses a scanning probe microscope that has a probe at the tip of a cantilever and acquires information on the sample surface by bringing the probe close to the sample. This scanning probe microscope generates image data based on the acquired information and displays an observation image of the sample surface based on the image data.

PRIOR ART DOCUMENT

Patent Document

Patent Document 1: Japanese Unexamined Patent Application Publication No. 2000-275159

SUMMARY OF THE INVENTION

Problems to be Solved by the Invention

There are cases where the scanning probe microscope described above generates image data by observing a sample containing particles, displays an observation image including particle images based on the image data, and calculates the number of particle images (hereinafter referred to as "number of particles") included in the image data using the image data. Further, there are cases where a scanning probe microscope performs analysis, such as statistical analysis, using information on the number of particles. In cases where a scanning probe microscope performs the processing, if the number of particles is not calculated correctly for some reason, or if the area on the sample that has been designated as the observation area contains an abnormality and should be excluded from the analysis, a problem can arise that prevents proper analysis from being performed on the sample.

The present invention has been made to solve the aforementioned problems, and the purpose of the present invention is to provide a technique that enables appropriate analysis to be performed on a sample.

Means for Solving the Problems

A scanning probe microscope according to one aspect of the present disclosure is provided with an observation device and an information processing device. The observation device observes a sample containing particles. The information processing device generates one or more observation images based on observation data acquired by observing the sample with the observation device. The information processing device calculates a particle parameter indicating a diameter of a particle image or the number of the particle images, the particle image being included in the observation mage. The information processing device performs predetermined processing when the observation image including an image of the particle in which the particle parameter is outside a predetermined range is included in the one or more observation images.

Effects of the Invention

According to the technology of the present disclosure, a range of a particle parameter indicating the diameter of a particle image or the number of particle images can be set, and inappropriate observation images containing particle images in which the particle parameter is outside of the range can be detected in one or more generated observation images. When it is detected that an inappropriate observation image is included in one or more observation images, the scanning probe microscope performs predetermined processing to notify the user that re-observation of the sample is necessary, or to exclude the inappropriate observation image from the analysis. Therefore, the scanning probe microscope can perform appropriate analysis on the sample.

EMBODIMENTS FOR CARRYING OUT THE INVENTION

Hereinafter, some embodiments of the present invention will be described with reference to the attached drawings. Note that, hereinafter, the same or equivalent part in the figures is assigned by the same reference symbol, and the description thereof will not be repeated

[Configuration of Scanning Probe Microscope]

Figure 1:
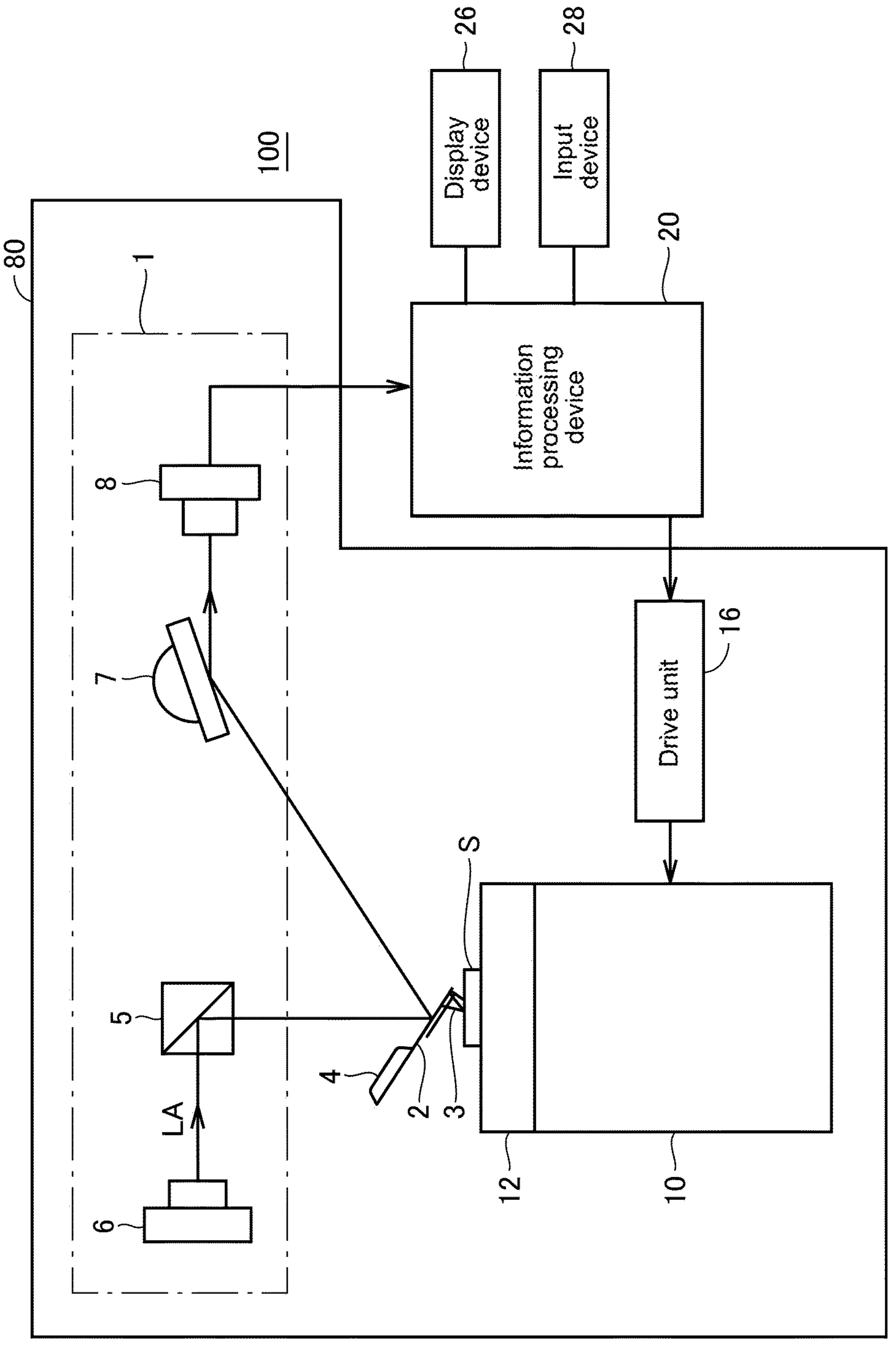
FIG. 1 is a diagram schematically showing a configuration of a scanning probe microscope according to an embodiment.

FIG. 1 is a diagram schematically showing a configuration of a scanning probe microscope according to an embodiment. The scanning probe microscope 100 according to the embodiment is an atomic force microscope (AFM: Atomic Force Microscope) for observing a sample S using the interatomic force (attraction or repulsion) that acts between the probe and the surface of the sample S.

Referring to FIG. 1, the scanning probe microscope 100 according to this embodiment is equipped with, as its main constituent components, an observation device 80, an information processing device 20, a display device 26, and an input device 28. The observation device 80 has, as its main constituent components, an optical system 1, a cantilever 2, a scanner 10, a sample holder 12, and a drive unit 16.

The scanner 10 has a cylindrical shape and is a moving device for changing the relative position between the sample S and the probe 3. The sample S is held on the sample holder 12 placed on the scanner 10. The scanner 10 has an XY scanner that scans the sample S in the two mutually orthogonal X- and Y-axis directions, and a Z scanner that moves the sample S slightly in a Z-axis direction orthogonal to the X-axis and the Y-axis. The XY scanner and the Z scanner are composed of piezoelectric elements configured to be deformed by the voltage applied from the drive unit 16, and the scanner 10 scans in the three-dimensional directions (the X-axis direction, the Y-axis direction, and the Z-axis direction) according to the voltage applied to the piezoelectric elements. With this, the relative positional relation between the sample S placed on the scanner 10 and the probe 3 can be changed.

The cantilever 2 has a front surface facing the sample S and a back surface opposite the front surface, and is supported by the holder 4. The cantilever 2 has a probe 3 on the surface of the tip end which is a free end. The probe 3 is arranged to face the sample S. The cantilever 2 is displaced in the Z-axis direction by the interatomic force acting between the probe 3 and the sample S.

Above the cantilever 2, an optical system 1 for detecting the displacement of the cantilever 2 in the Z-axis direction is provided. The optical system 1 emits a laser light onto the back surface of the cantilever 2 and detects the laser light reflected from the back surface of the cantilever 2 during the observation of the sample S. The optical system 1 has a laser light source 6, a beam splitter 5, a reflective mirror 7, and a photodetector 8.

The laser light source 6 has a laser oscillator that emits a laser light. The photodetector 8 has a photodiode for detecting the incoming laser light. The laser light LA emitted from the laser light source 6 is reflected by the beam splitter 5 and emitted onto the back surface of the cantilever 2.

The back surface of the cantilever 2 is a mirror surface and can reflect the laser light emitted from the optical system 1. The laser light reflected by the back surface of the cantilever 2 is further reflected by the reflective mirror 7 and enters into the photodetector 8. The displacement of the cantilever 2 can be detected by detecting the laser light with the photodetector 8.

Specifically, the photodetector 8 has a light-receiving surface divided into a plurality (usually two) of sections in the displacement direction (Z-axis direction) of the cantilever 2. Alternatively, the photodetector 8 has a light-receiving surface divided into four sections both in the Z-axis direction and the Y-axis direction. As the cantilever 2 is displaced in the Z-axis direction, the ratio of the amount of light emitted to these multiple light-receiving surfaces changes. The photodetector 8 outputs the detection signal to the information processing device 20 according to the plurality of received light amounts. The detection signal corresponds to the "observation data acquired by the sample S being observed by the observation device 80" of the present disclosure.

The information processing device 20 is communicatively connected to the optical system 1, the drive unit 16, the display device 26, and the input device 28. The information processing device 20 generates image data based on the detection signal output from the photodetector 8 over a given observation region. In the case of observing a sample S containing particles by the scanning probe microscope 100, assuming that the particles are spherical in shape, the amount of displacement (deflection) of the cantilever 2 in the Z-axis direction indicates the diameter of the particle.

The information processing device 20 makes the display device 26 display the observation image based on the generated image data. The observation image is an image showing the surface of the sample S. Further, the information processing device 20 controls the drive unit 16 to drive the scanner 10 in the three-dimensional directions.

The scanning range in the X-axis direction and the Y-axis direction in the XY scanner is limited by the operable range of the piezoelectric element. Therefore, in the case where the observation range of the sample S exceeds this scanning range, the scanning probe microscope 100 divides the observation range into N (N is an integer equal to or greater than 2) regions to observe the sample S. In the case where the scanning probe microscope 100 observes the sample S by dividing it into N regions, the observation device 80 outputs the detection signals corresponding to N pieces of regions obtained by each observation region to the information processing device 20. The information processing device 20 generates N pieces of image data based on the detection signal for each of the N pieces of regions. The information processing device 20 displays a list of observation images corresponding to the N pieces of image data on the display device 26, which is configured by a liquid crystal panel or the like. Hereafter, the image of each particle included in the observation image is referred to as the "particle image (see the particle image 271 in FIG. 6 and FIG. 7 described below).

The input device 28 accepts the user's input operation. The input device 28 outputs the signal corresponding to the user's operation to the information processing device 20. The input device 28 may be a touch panel provided on the display device 26 or may be a dedicated control button or physical operating keys, such as a mouse and a keyboard.

[Hardware Configuration of Information Processing Device]

Figure 2:
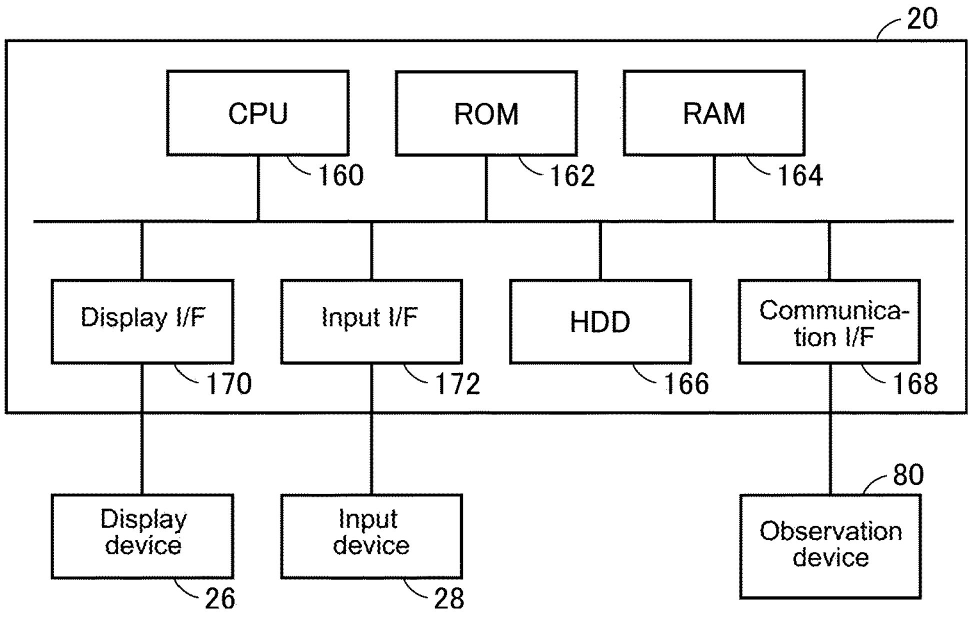
FIG. 2 is a diagram showing one example of a hardware configuration of an information processing device.

FIG. 2 is a diagram showing one example of a hardware configuration of the information processing device 20. The information processing device 20 has, as its main constituent elements, a CPU (Central Processing Unit) 160, a ROM (Read Only Memory) 162, a RAM (Random Access Memory) 164, an HDD (Hard Disk Drive) 166, a communication I/F 168, a display I/F 170, and an input I/F 172. Each constituent element is interconnected by a data bus. Note that at least a part of the hardware configuration of the information processing device 20 may be provided inside the observation device 80. Alternatively, the information processing device 20 may be configured as a unit separate from the scanning probe microscope 100, and may be configured to communicate bidirectionally with the scanning probe microscope 100.

The communication I/F 168 is an interface for communicating with the observation device 80. The display I/F 170 is an interface for communicating with the display device 26. The input I/F 172 is an interface for communicating with the input device 28.

The ROM 162 stores a program to be executed by the CPU 160. The RAM 164 can temporarily store the data generated by executing the programs in the CPU 160 and the data input via the communication I/F 168. The RAM 164 can function as a temporary data memory used as a work region. The HDD 166 is a nonvolatile storage device. Further, in place of the HDD 166, a semiconductor storage device, such as flash memory, may be employed.

Further, the program stored in the ROM 162 may be stored in a recording medium and distributed as a program product. Alternatively, the program may be provided by an information provider as a program product that can be downloaded via the so-called Internet or other means. The information processing device 20 reads a program provided by a storage medium or the Internet. The information processing device 20 stores the read program in a predetermined storage area (e.g., the ROM 162). The CPU 160 performs the above-mentioned display processing by executing the stored program.

The recording media is not limited to a DVD-ROM (Digital Versatile Disk Read Only Memory), a CD-ROM (compact disc read-only memory), an FD (Flexible Disk), and a hard disk, but may be a medium capable of fixedly carrying a program, such as a semiconductor memory exemplified by e.g., a magnetic tape, a cassette tape, an optical disk (MO (Magnetic Optical Disc/MD (Mini Disc/DVD (Digital Versatile Disc)), an optical card, a mask ROM, an EPROM (Electronically Programmable Read-Only Memory), an EEPROM (Electronically Erasable Programmable Read-Only Memory), and a flash ROM. Further, a recording medium is a non-transitory medium in which a computer can read a program, etc.

[Processing of Information Processing Device]

Figure 3:
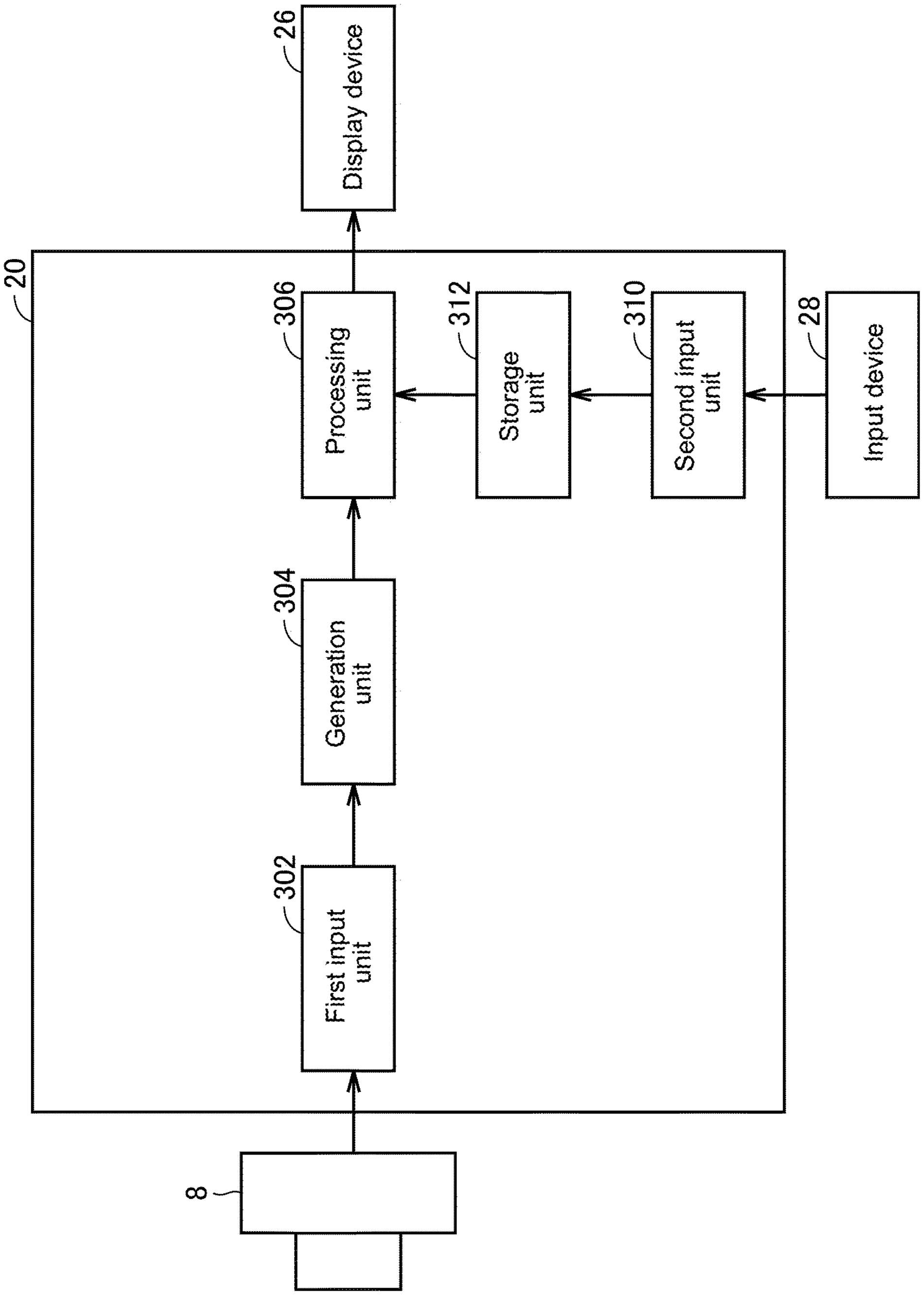
FIG. 3 is one example of a functional block diagram of an information processing device.

FIG. 3 is one example of a functional block diagram of the information processing device 20. The information processing device 20 includes a first input unit 302, a generation unit 304, a processing unit 306, a second input unit 310, and a storage unit 312.

The first input unit 302 receives a detection signal input from the photodetector 8 and outputs a detection signal to the generation unit 304. The generation unit 304 generates image data based on a detection signal and outputs image data to the processing unit 306. The processing unit 306 makes the display device 26 display the observation image based on the image data. In the case where the scanning probe microscope 100 observes the sample S by dividing it into N times, the processing unit 306 makes the display device 26 display a list of N pieces of observation images corresponding to each of the N pieces of divided observation regions. Note that the number of divisions N of the observation range may be set by the user or automatically set by the information processing device 20.

The processing unit 306 executes predetermined analysis processing on the image data of the sample S. The predetermined analysis processing includes a particle analysis. The particle analysis includes, for example, the processing (hereinafter also referred to as "counting processing") to count the number of particle images included in the observation image. Further, the particle analysis includes, for example, the processing to generate data of histogram showing the relation between the particle size of particles included in all observation images of the sample S and the number of particle images of particles having the particle size. The particle analysis may include other processing other than the above. The user can select the particle analysis to be executed by the information processing device 20.

The user can select an observation image to be the target of the analysis processing from among the N pieces of observation images displayed on the display device 26. The user selects an observation image to be the target of the analysis processing using the input device 28 while viewing the list of observation images displayed on the display device 26. The second input unit 310 receives input information input by the user from the input device 28. This input information is information indicating the observation image selected by the user. The input information is once stored in the storage unit 312. The processing unit 306 executes analysis processing on the image data of the observation image (i.e., the observation image selected by the user) indicated by the input information. This configuration allows the user to have the information processing device 20 execute the analysis processing for the observation image selected by the user.

By the way, the user may be able to estimate the range of the approximate number of particle images included in one observation image of the sample S (hereinafter also referred to as "estimated range") from the part number, etc., of the sample S of the observation target. Such a sample S is, for example, an abrasive. In the following, the case in which the scanning probe microscope 100 observes an abrasive is described.

Further, the N observation images displayed on the display device 26 may include observation images in which the number of particle images is greater or less than the estimated range (hereinafter also referred to as "inappropriate observation image"). First, the case will be described in which an observation image in which the number of particle images is greater than the estimated range is included.

For example, there are cases where the probe 3 becomes damaged, causing its tip to become bifurcated. In this case, during the scanning of the scanner 10, an interatomic force acts twice in succession between one particle and the probe 3, resulting in the processing unit 306 counting one particle as two particles. In the case where the tip of the probe 3 becomes bifurcated, the processing unit 306 counts about twice the actual number of particles. As a result of this counting, the number of particle images becomes greater than the estimated range. Further, also in the case where the sample S contains a large number of impurities, the number of particle images will become greater than the estimated range. Further, in the case where the density of particles in the abrasive is abnormally small, for example, due to the abrasive not being properly stirred, the number of particle images becomes less than the estimated range.

As described above, there are cases where the number of particle images is not correctly calculated due to some reasons (e.g., the tip of probe 3 becoming bifurcated), or there is an abnormality in the part of the sample S designated as the observation region (e.g., the sample S contains a large number of impurities), resulting in the inclusion of regions that should be excluded from the analysis.

It is also conceivable to configure such that the user checks the number of particle images in each observation image and selects the observation images that are to be excluded from the analysis target. However, in the scanning probe microscope 100 configured as described above, it is necessary for the user to confirm the number of particle images included in the observation image, imposing a burden on the user. Further, in this configuration, if the user mistakenly selects an inappropriate observation image, analysis processing (e.g., processing to generate histogram data showing the relation between the particle size and the number of particle images of particles having the size) is performed on the observation image data corresponding to the inappropriate observation image, without performing the appropriate analysis. As a result, it can cause the problem of obtaining incorrect analysis results (incorrect histograms).

For this reason, in the scanning probe microscope 100 of this embodiment, it is configured to enable the user to set a normal range for the number of particle images. The normal range corresponds to the estimated range described above. The scanning probe microscope 100 causes the display device 26 to display the observation images including particle images outside the normal range (i.e., inappropriate observation image) so as to be non-selectable by the user. This prevents the user from selecting inappropriate observation images. Therefore, the scanning probe microscope 100 is prevented from performing analysis processing on the observation image data corresponding to inappropriate observation image. Therefore, the scanning probe microscope 100 can perform proper particle analysis (i.e., it can perform the proper analysis on the sample).

Figure 4:
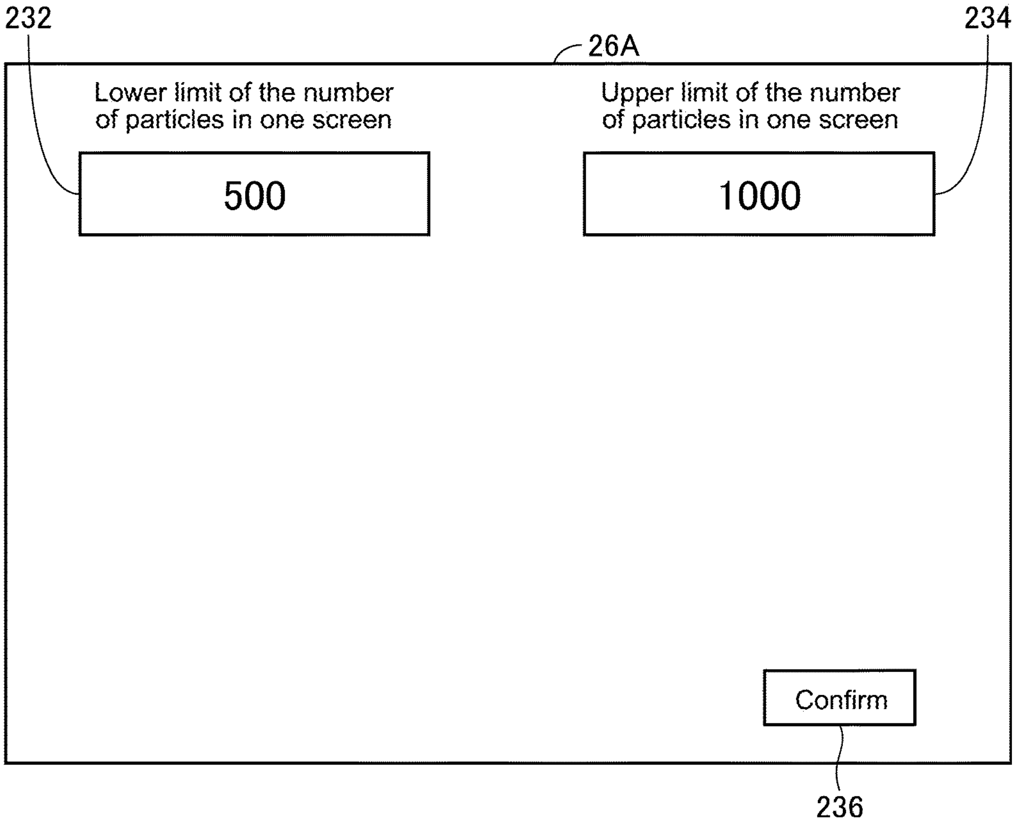
FIG. 4 is one example of a threshold setting screen.

FIG. 4 is one example of a setting screen for the user to set the normal range. The setting screen shown in FIG. 4 is displayed in the display region 26A of the display device 26 when the user performs a predetermined operation on the input device 28 to display the setting screen.

Referring to FIG. 4, the setting screen includes an input region 234 for the input of the upper limit of particle images in one observation screen and a confirm button 236.

The user enters the upper limit for the number of particle images in one observation screen in the input region 234 using the input device 28. When the confirm button 236 is operated by the user after the upper and lower limit values are entered, the second input unit 310 receives the upper and lower limit value inputs and stores the upper and lower limit values in the storage unit 312. In this way, the user sets the normal range, which is defined by the upper and lower limits. As described above, since the user can set the desired normal range, the user can have the information processing device 20 perform analysis processing using an observation image within the normal range.

FIG. 4 shows an example in which 500 is set as the lower limit and 1,000 as the upper limit. In other words, 500≤M≤1,000 (M is the number of particle images in one observation image) is set as the normal range.

[Flowchart of Information Processing Device]

Figure 5:
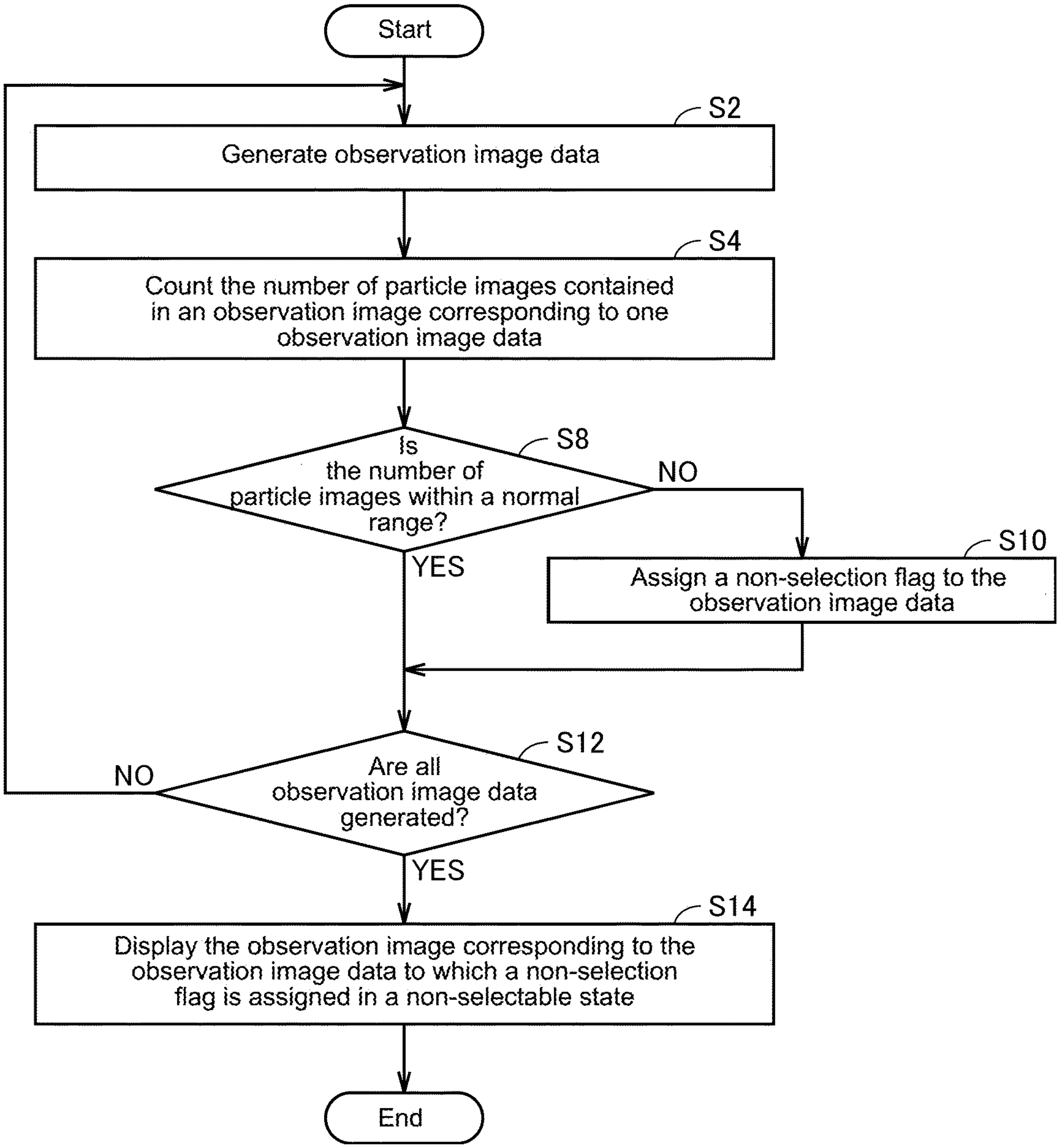
FIG. 5 is one example of a flowchart of an information processing device.

FIG. 5 is one example of the flowchart of the information processing device 20. The processing in FIG. 5 is initiated, for example, when a predetermined start operation is performed by the user on the scanning probe microscope 100. Referring to FIG. 5, in Step S2, the generation unit 304 generates observation image data based on the detection signal. In Step S4, the processing unit 306 counts the number of particle images included in the observation image corresponding to one observation image data. Next, in Step S8, the processing unit 306 determines whether the count value of the particle images included in one observation image is within the normal range. If the count value of the particle image is outside the normal range (NO in Step S8), the process proceeds to Step S10.

In Step S10, the processing unit 306 assigns a non-selection flag to the observation image data corresponding to the observation image in which the count value of the particle image is outside the normal range. When the processing of Step S10 is completed, and when it is determined as YES in Step S8, the process proceeds to Step S12.

In Step S12, the processing unit 306 determines whether all observation image data has been generated. If all observation image data has not been generated (NO in Step S12), the process returns to Step S2. On the other hand, if all observation image data has been generated (YES in Step S12), the process proceeds to Step S14.

In Step S14, the processing unit 306 displays a list of observation images so that the user cannot select the observation image corresponding to the observation image data to which the non-selection flag was assigned in Step S10, and the user can select an observation image corresponding to the observation image data to which the non-selection flag was not assigned.

Figure 6:
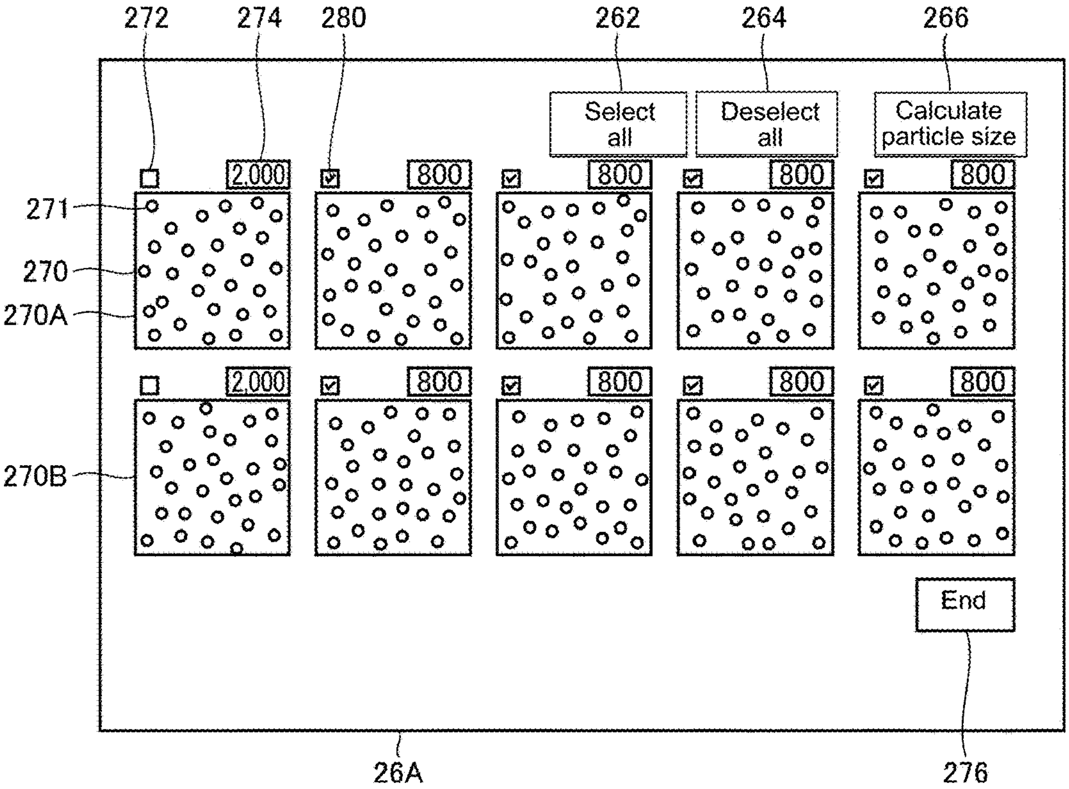
FIG. 6 is one example of a list screen.

FIG. 6 is one example of the list screen displayed in Step S14. The list screen shown in the example in FIG. 6 displays ten pieces of observation images 270. Each of the observation images 270 includes one or more particle images 271. Corresponding to each of the ten observation images 270, a checkbox 272 and a display region 274 are displayed. In addition, a selection button 262, a release button 264, a particle size calculation button 266, and an end button 276 are displayed.

In the display region 274, the number of particle images included in the observation image corresponding to the display region 274 is displayed. In the example in FIG. 6, the number of particle images 271 in the observation image 270A and the observation image 270B is 2,000, as is the number of particles shown in the display region 274 of the observation image 270A and the observation image 270B. Therefore, the observation image 270A and the observation image 270B are inappropriate images in which the particle counts do not belong to the normal range (0≤M≤500). In other words, the observation image data of the observation image 270A and the observation image 270B are the image data to which a non-selection flag has been assigned in Step S10. Therefore, in the example of FIG. 6, the observation image 270A and the observation image 270B are displayed in a non-selectable state. In the example in FIG. 6, the non-selectable state is a state in which a check 280 is not displayed in the checkbox 272.

On the other hand, out of the ten observation images 270, the observation images other than the observation image 270A and the observation image 270B are appropriate observation images. Therefore, out of the ten observation images 270, the observation images other than the observation image 270A and the observation image 270B are displayed in a selectable state.

Thus, "the process to display on the display device 26 an observation image including a particle image in which the number of particles is within the normal range so as to be selectable by the user, and display on the display device 26 an observation image including a particle image in which the number of particles is outside the normal range so as to be non-selectable by the user" corresponds to the predetermined processing of the present disclosure.

By clicking on the checkbox 272, the user can show or hide the check 280 in the checkbox 272. Further, for the checkboxes 272 of the observation images 270A and 270B, even if clicked, the check 280 will not be displayed. This allows the user to recognize that the observation image 270A and the observation image 270B are inappropriate images.

When the particle size calculation button 266 is operated, the processing unit 306 executes analysis processing (in the example in FIG. 6, particle diameter calculation) on the observation image data corresponding to the observation image with the check 280 displayed. On the other hand, the processing unit 306 does not execute analysis processing on the observation image data corresponding to the observation image to which no check 280 is displayed. Since the user cannot select the observation image 270A and the observation image 270B, analysis processing can be prevented from being executed on the observation image data for each of the observation image 270A and the observation image 270B.

Further, the number of particles (the number of particle images) included in the observation image is displayed in the display region 274. In the example in FIG. 6, for the observation image 270A and the observation image 270B, "2,000" is displayed in the display region 274, and for the other observation images, "800" is displayed in the display region 274. This allows the user to recognize the number of particles in the observation image.

Further, when the selection button 262 is operated, checks 280 are displayed simultaneously in all checkboxes 272 for the appropriate observation images. Further, when the release button 264 is operated, the checks 280 displayed in all checkboxes 272 for the appropriate observation images will be hidden all at once. In this way, the checks 280 can be displayed or hidden at once, so that the user's convenience can be improved. Further, when the end button 276 is operated, the list screen transitions to another screen (e.g., the home screen).

In the example of FIG. 6, the scanning probe microscope 100 can prevent the user from selecting inappropriate observation images. Further, the scanning probe microscope 100 allows the user to select observation images to be the target of analysis processing.

Other Embodiments (1) The list screen in FIG. 6 describes the configuration in which inappropriate observation images are displayed on the display device 26 in a non-selectable state. However, a configuration may be employed in which inappropriate observation images are not displayed on the display device 26.

Figure 7:
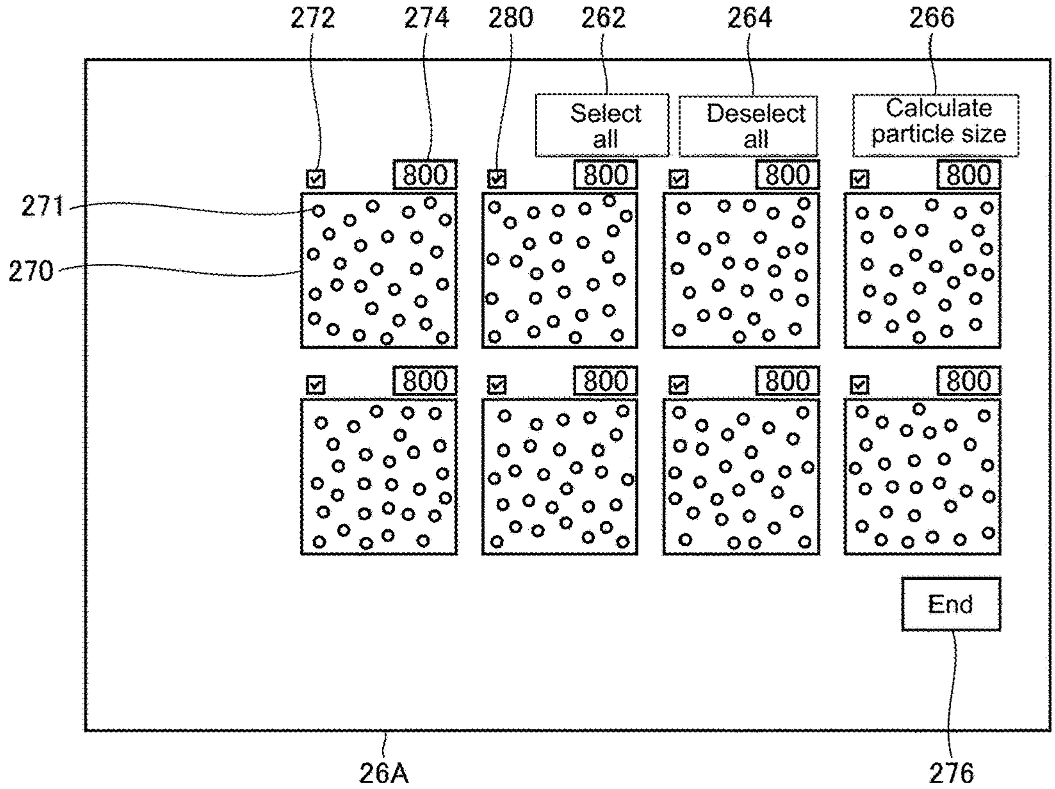
FIG. 7 is one example of a list screen in another embodiment.

FIG. 7 is one example of a list screen in this embodiment. In FIG. 7, inappropriate observation images (the observation image 270A and the observation image 270B in FIG. 6) are not displayed on the display device 26. The configuration shown in FIG. 8 prevents analysis procedures from being executed on observation image data corresponding to inappropriate observation images. Further, since inappropriate observation images are not displayed, the number of observation images can be reduced, making the list screen easier for the user to view. Further, when the particle size calculation button 266 is operated, the processing unit 306 executes analysis processing (in the example in FIG. 7, the calculation of the particle diameter) on the observation image data corresponding to the observation image with the check 280 displayed.

Figure 8:
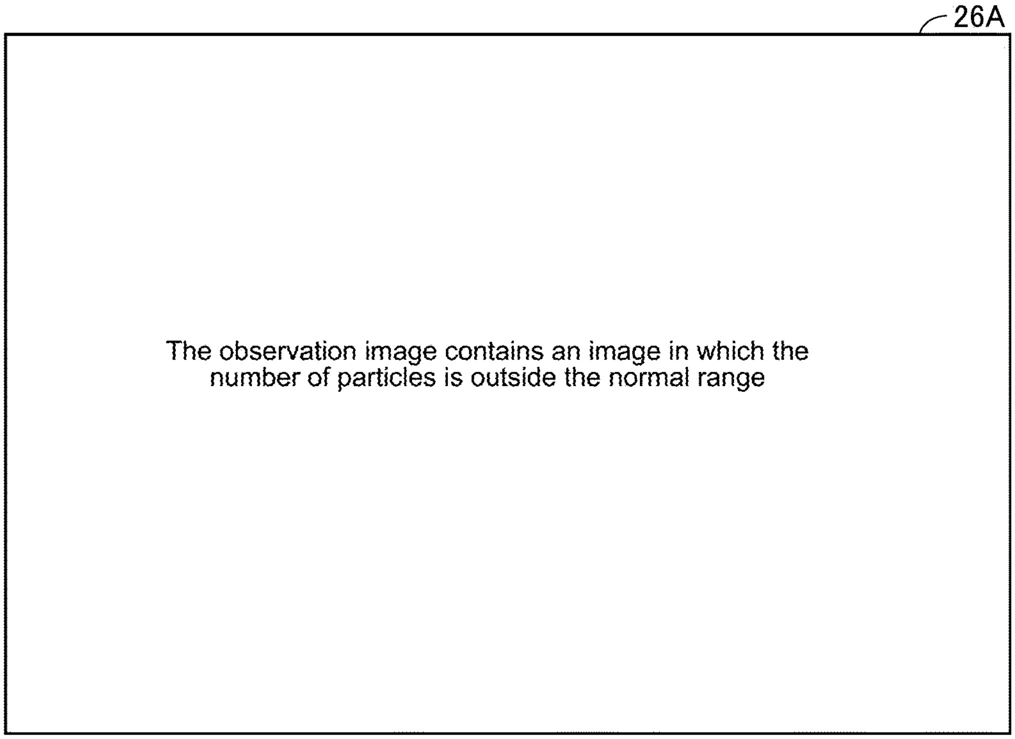
FIG. 8 is one example of a screen for an abnormal notification.

(2) If the generation unit 304 generates observation image data corresponding to an inappropriate observation image, the processing unit 306 may perform a predetermined abnormality notification. The abnormality notification may be, for example, the display of an image for abnormality notification on the display device 26, or the output of an abnormality sound from a speaker (not shown). FIG. 8 is one example of an image for abnormality notification. In the example in FIG. 8, an image is displayed with a statement such as "The observation image contains an observation image in which the number of particles is outside the normal range." With such an abnormality notification, the scanning probe microscope 100 can make the user recognize that an inappropriate observation image has been obtained. Further in cases where an inappropriate observation image is included, the user can replace the damaged probe 3 or the sample S, etc., so that the scanning probe microscope 100 can perform appropriate particle analysis.

(3) In the above embodiment, a configuration in which observation images are displayed on the display device 26 was described. However, the scanning probe microscope 100 can be configured not to display observation images on the display device 26. Further, in this case, the processing unit 306 may execute analysis processing for observation image data corresponding to appropriate observation images and not executing analysis processing (regulating the execution of analysis processing) for observation image data corresponding to inappropriate observation images. Even with this configuration, the scanning probe microscope 100 can still perform proper particle analysis.

(4) in the above embodiment, the configuration is described in which the particle parameter to be determined whether it is within the normal range is the number of particle images. However, a configuration in which the particle parameter is the particle diameter may be employed. In this configuration, the processing unit 306 calculates, for the observation image data generated by the generation unit 304, the diameter of particles in the observation image corresponding to the observation image data. Further, the processing unit 306 displays a list of observation images and executes analysis processing on the observation image data of the observation image selected by the user. This particle analysis processing is, for example, the processing to generate histogram data showing the particle size of the particles in the sample S and the number of particle images of the particles that are the particle size.

As described in the above embodiment, the processing unit 306 calculates the particle diameter by assuming that the displacement in the Z-axis direction of the cantilever 2 is the particle diameter. For example, if the density of particles in the sample S is abnormally large, the Z-axis direction displacement of the cantilever 2 will be larger than the actual particle diameter due to the stacking of a plurality of particles. Further, in the case where the sample S is defective, the particles of the sample S may be abnormally small in size. Thus, if the generation unit 304 generates observation image data with abnormally large or abnormally small particle sizes, inappropriate analysis processing (inappropriate histogram generation processing) will be executed.

Figure 9:
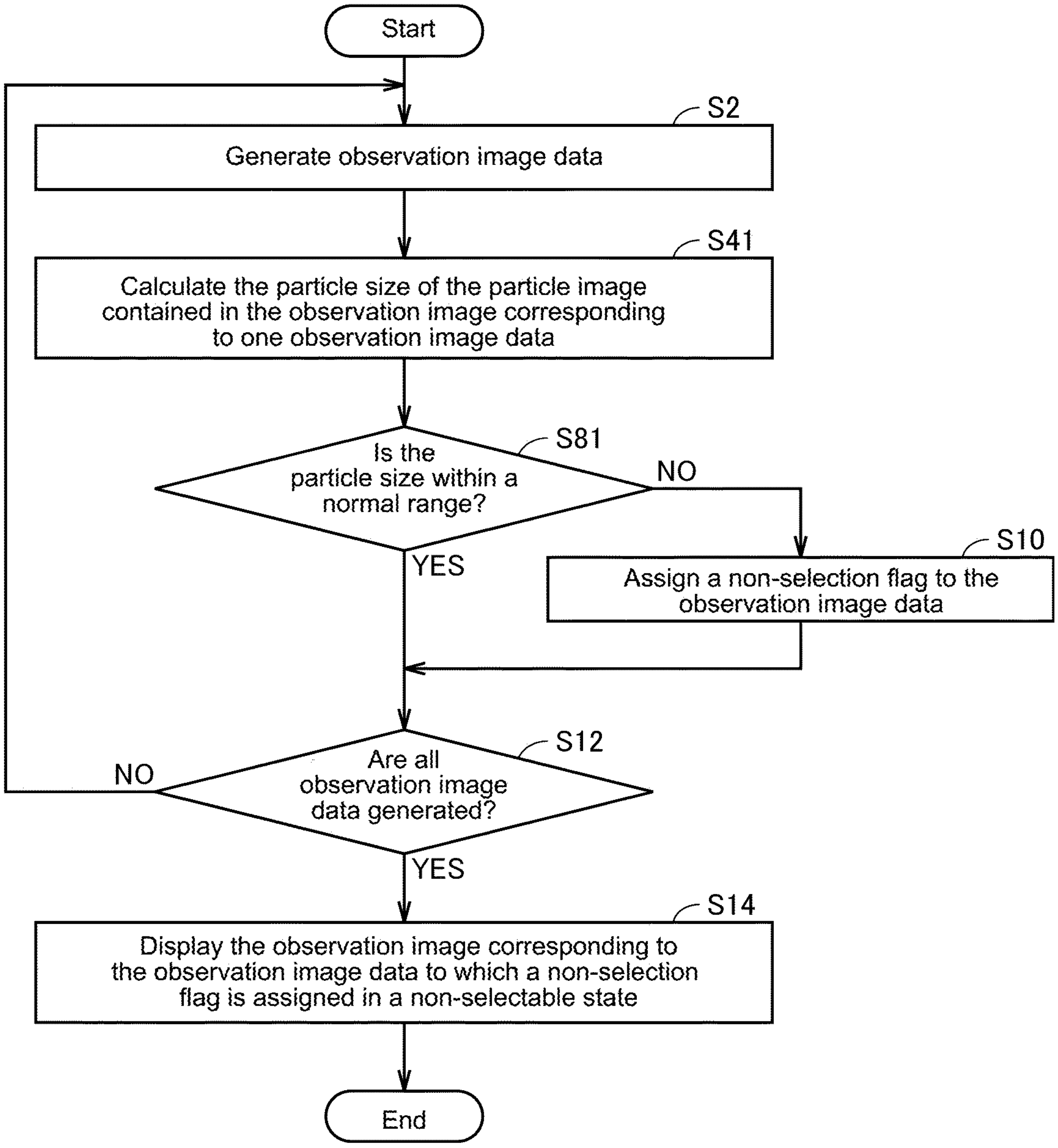
FIG. 9 is one example of a flowchart of an information processing device of another embodiment.

Therefore, the scanning probe microscope 100 may execute the processing of the embodiment described above with the particle parameter as the particle size. In this configuration, the user sets a normal range for the particle size. FIG. 9 is one example of the flowchart of the information processing device of this embodiment. In Step S41 following Step S2 in FIG. 9, the processing unit 306 calculates the particle diameters of the particle images included in an observation image corresponding to one observation image data. This calculation of the particle size is achieved by a predefined method. Next, in Step S81, the processing unit 306 determines whether the calculated particle diameter belongs to the normal range. If it is determined to be NO in Step S81, the process proceeds to Step S10, and if it is determined to be YES in Step S81, the process proceeds to Step S12. Further, the particle parameter may include both the particle size and the number of particles.

(5) In the above embodiment, an example is shown in which the normal range is defined by the upper limit and the lower limit (see FIG. 4, etc.). However, the normal range may be defined by the upper limit or the lower limit. If the normal range is defined by the upper limit, the normal range is 0≤M≤upper limit. Furthermore, if the normal range is defined by the lower limit, the normal range is the lower limit≤M≤∞. Thus, the normal value is defined by at least one of the upper and lower limits. Therefore, the information processing device 20 can set the normal range based on at least one of the upper and lower limit values.

(6) In the above embodiment, a configuration is described in which the user sets the normal range (see FIG. 4, etc.). However, the processing unit 306 of the information processing device 20 may set the normal range. For example, a normal range is associated with each sample ID (identification) of a plurality of samples S. The user inputs the sample ID using the input device 28, and the information processing device 20 sets the normal range corresponding to the input sample ID. This configuration reduces the burden on the user to set the normal range.

(7) In the above-described embodiment, the configuration was described in which the concept of this embodiment is employed in a scanning probe microscope. However, the concept of this embodiment may be employed in microscopes (e.g., scanning confocal laser microscopes) other than a scanning probe microscope.

[Aspects]

It would be understood by those skilled in the art that the plurality of exemplary embodiments described above is specific examples of the following aspects.

(Item 1)

A scanning probe microscope according to one aspect is provided with:

an observation device configured to observe a sample containing particles; and an information processing device, wherein the information processing device generates one or more observation images based on observation data acquired by observing the sample with the observation device, calculates a particle parameter indicating a diameter of a particle image or the number of the particle images, the particle image being included in the observation mage, and executes predetermined processing when the observation image including an image of the particle in which the particle parameter is outside a predetermined range is included in the one or more observation images.

According to the scanning probe microscope as recited in the above-described Item 1, a range of the particle parameter indicating the diameter of the particle image or the number of the particle images can be set, and it is possible to detect that an inappropriate observation image, which includes a particle image in which the particle parameter is outside the range, is included in one or more of the generated observation images. When it is detected that an inappropriate observation image is included in one or more observation images, the scanning probe microscope performs predetermined processing to notify the user that re-observation of the sample is necessary, or to exclude the inappropriate observation image from the analysis. Therefore, the scanning probe microscope can perform an appropriate analysis on the sample.

(Item 2)

The scanning probe microscope as recited in the above-described Item 1, wherein the scanning probe microscope is equipped with a display unit that is controlled by the information processing device, wherein the predetermined processing includes processing to display on the display unit the observation image in which the particle parameter is within the range so as to be selectable by a user, and processing to display on the display unit the observation image including the image of the particle in which the particle parameter is outside the range so as to be non-selectable by the user, and wherein the information processing device executes analysis processing on observation image data corresponding to the observation image selected by the user.

According to the scanning probe microscope as recited in the above-described Item 2, it is possible to prevent the user from selecting inappropriate observation images, which allows the user to select observation images for analysis processing.

(Item 3)

The scanning probe microscope as recited in the above-described Item 1, wherein the scanning probe microscope is equipped with a display unit that is controlled by the information processing device, and wherein the predetermined processing includes processing to display on the display unit the observation image in which the particle parameter is within the range, and processing not to display the observation image in which the particle parameter is outside the range.

According to the scanning probe microscope as recited in the above-described Item 3, since inappropriate observation images are not displayed, the number of displayed observation images can be reduced, making the list of observation images easier for the user to view.

(Item 4)

In the scanning probe microscope as recited in the above-described Item 3, when the observation image displayed on the display unit is selected by the user, the information processing device executes analysis processing on observation image data corresponding to the selected observation image.

According to the scanning probe microscope as recited in the above-described Item 4, it is possible to enable the user to select observation images to be the target of analysis processing.

(Item 5)

In the scanning probe microscope as recited in the above-described Item 1, the predetermined processing includes processing to execute analysis processing on the observation image data corresponding to an observation image in which the particle parameter is within the range, and processing to regulate execution of analysis processing on observation image data corresponding to an observation image in which the particle parameter is outside the range.

According to the scanning probe microscope as recited in the above-described Item 5, it is possible to prevent analysis processing from being executed on observation image data corresponding to an inappropriate observation image.

(Item 6)

In the scanning probe microscope as recited in any one of the above-described Items 1 to 5, the predetermined processing includes processing to notify that the observation image including an image of the particle in which the particle parameter is outside the range is included in one or more observation images.

According to the scanning probe microscope as recited in the above-described Item 6, it is possible to make the user recognize that an inappropriate observation image has been generated.

(Item 7)

In the scanning probe microscope as recited in any one of the above-described Items 1 to 6, the range is determined by at least one of upper and ower limit of the particle parameter.

According to the scanning probe microscope as recited in the above-described Item 7, it is possible for the information processing device to set at least one of upper and lower limits of the particle parameter.

(Item 8)

In the scanning probe microscope as recited in any one of the above-described Items 1 to 7, the range is settable by a user.

According to the scanning probe microscope as recited in the above-described Item 8, it is possible to have the information processing device execute the analysis processing using the observation images of the normal range desired by the user.

(Item 9)

An information processing method according to one aspect is an information processing method using an observation device for observing a sample containing particles and an information processing device capable of communicating with the observation device, comprising:

- a step of generating one or more observation images based on observation data acquired by observing the sample with the observation device;
- a step of calculating a particle parameter indicating a diameter of the particle image or the number of the particle image, the particle image being included in the observation image; and
- a step of executing predetermined processing when the observation image including an image of a particle in which the particle parameter is outside a predetermined range is included in one or more observation images.

According to the information processing method as recited in the above-described Item 9, it is possible to detect the presence of inappropriate observation image including a particle image in which the particle parameter indicating the diameter of the particle image or the number of particle images is outside a predetermined range, within one or more observation images that have been generated. When it is detected that an inappropriate observation image is included in one or more observation images, a predetermined process is executed to recognize the user that re-observation of the sample is necessary or to exclude the inappropriate observation image from the analysis. Therefore, this information processing method allows an appropriate analysis to be performed on samples.

(Item 10)

A program according to one aspect is configured to make a computer, which is capable of communicating with an observation device for observing a sample containing particles, execute:

- a step of generating one or more observation images based on observation data acquired by observing the sample with the observation device;
- a step of calculating a particle parameter indicating a diameter of a particle image or the number of the particle images, the particle image being included in the observation image; and
- a step of executing predetermined processing when the observation image including an image of a particle in which the particle parameter is outside a predetermined range is included in one or more observation images.

According to the program as recited in the above-described Item 10, it is possible to detect the presence of an inappropriate observation image including a particle image in which the particle parameter indicating the diameter of the particle image or the number of particle images is outside a predetermined range, within one or more observation images that have been generated. When it is detected that an inappropriate observation image is includes in one or more observation images, predetermined processing is executed to recognize the user that re-observation of the sample is necessary, or the inappropriate observation image from the analysis is excluded. Therefore, according to this information processing method, an appropriate analysis can be performed on samples.

Each of the disclosed embodiments is planned to be implemented in combination as appropriate to the extent that it is not technically inconsistent. Note that the embodiments disclosed here should be considered illustrative and not restrictive in all respects. It should be noted that the scope of the embodiments is indicated by claims and is intended to include all modifications within the meaning and scope of the claims and equivalents.

DESCRIPTION OF REFERENCE SYMBOLS

1: Optical system
2: Cantilever
3: Probe needle
4: Holder
5: Beam splitter
6: Laser light source
7: Reflective mirror
8: Photodetector
10: Scanner
12: Sample holder
16: Drive unit
20: Information processing device
26: Display device
26A: Display Region
28: Input device
80: Observation device
100: Scanning probe microscope
162: ROM
164: RAM
200: Analyzer
304: Generation unit
236: Confirm button
262: Selection button
264: Release button
266: Particle size calculation button
270: Observation image
271: Particle image
272: Checkbox
274: Display region
276: End button
280: Check
302: First input unit
306: Processing unit
310: Second input unit
312: Storage unit

The invention claimed is:

1. A scanning probe microscope comprising:

an observation device configured to observe a sample containing particles;

an information processing device; and a display unit that is controlled by the information processing device, wherein the information processing device is configured to:

- generate one or more observation images based on observation data acquired by observing the sample with the observation device,
- calculate a particle parameter indicating a diameter of a particle or a number of particle images, the particle images being included in an observation image of the one or more observation images, and
- execute predetermined processing when the observation image including an image of the particle in which the particle parameter is outside a predetermined range is included in the one or more observation images, wherein the predetermined processing includes:

processing to display on the display unit the observation image in which the particle parameter is within the predetermined range so as to be selectable by a user, and processing to display on the display unit the observation image including the image of the particle in which the particle parameter is outside the predetermined range so as to be non-selectable by the user, and wherein the information processing device is configured to:

execute analysis processing on observation image data corresponding to the observation image selected by the user, and calculate the diameter of the particle based on diameters of the particle images included in the observation image.

2. The scanning probe microscope as recited in claim 1, wherein the predetermined processing includes:

processing to execute analysis processing on observation image data corresponding to an observation image in which the particle parameter is within the predetermined range, and processing to regulate execution of analysis processing on observation image data corresponding to an observation image in which the particle parameter is outside the predetermined range.

3. The scanning probe microscope as recited in claim 1, wherein the predetermined processing includes processing to notify that the observation image including an image of the particle in which the particle parameter is outside the predetermined range is included in one or more observation images.

4. The scanning probe microscope as recited in claim 1, wherein the predetermined range is determined by at least one of upper and lower limits of the particle parameter.

5. The scanning probe microscope as recited in claim 1, wherein the predetermined range is settable by a user.

6. The scanning probe microscope as recited in claim 1, wherein the diameter of the particle is either an average, a maximum, or a minimum value of diameters of multiple particle images included in the observation image.

7. A scanning probe microscope comprising:

an observation device configured to observe a sample containing particles;

an information processing device; and a display unit that is controlled by the information processing device, wherein the information processing device is configured to:

generate one or more observation images based on observation data acquired by observing the sample with the observation device, calculate a particle parameter indicating a diameter of a particle or a number of particle images, the particle images being included in an observation image of the one or more observation images, and execute predetermined processing when the observation image including an image of the particle in which the particle parameter is outside a predetermined range is included in the one or more observation images, wherein the predetermined processing includes processing to display on the display unit the observation image in which the particle parameter is within the predetermined range, and processing not to display the observation image in which the particle parameter is outside the predetermined range, and wherein the information processing device is configured to calculate the diameter of the particle based on the diameters of the particle images included in the observation image.

8. The scanning probe microscope as recited in claim 7, wherein when the observation image displayed on the display unit is selected by a user, the information processing device executes analysis processing on observation image data corresponding to the selected observation image.

9. The scanning probe microscope as recited in claim 7, wherein the diameter of the particle is either an average, a maximum, or a minimum value of diameters of multiple particle images included in the observation image.

10. An information processing method using an observation device for observing a sample containing particles and an information processing device capable of communicating with the observation device, comprising:

generating one or more observation images based on observation data acquired by observing the sample with the observation device;

calculating a particle parameter indicating a diameter of a particle or a number of particle images, the particle images being included in an observation image of the one or more observation images; and executing predetermined processing when the observation image including an image of a particle in which the particle parameter is outside a predetermined range is included in one or more observation images, wherein the predetermined processing includes:

processing to display on a display unit the observation image in which the particle parameter is within the predetermined range so as to be selectable by a user, and processing to display on the display unit the observation image including the image of the particle in which the particle parameter is outside the predetermined range so as to be non-selectable by the user, and wherein the information processing method further comprises:

executing analysis processing on observation image data corresponding to the observation image selected by the user, and calculating the diameter of the particle based on the diameters of the particle images included in the observation image.

11. The information processing method as recited in claim 10, wherein the diameter of the particle is either an average, a maximum, or a minimum value of diameters of multiple particle images included in the observation image.

* * * * *